Oct. 27, 1931.        S. D. SHINKLE         1,828,985
METHOD OF SUPERFICIALLY FINISHING RUBBER ARTICLES
Original Filed Dec. 13, 1926
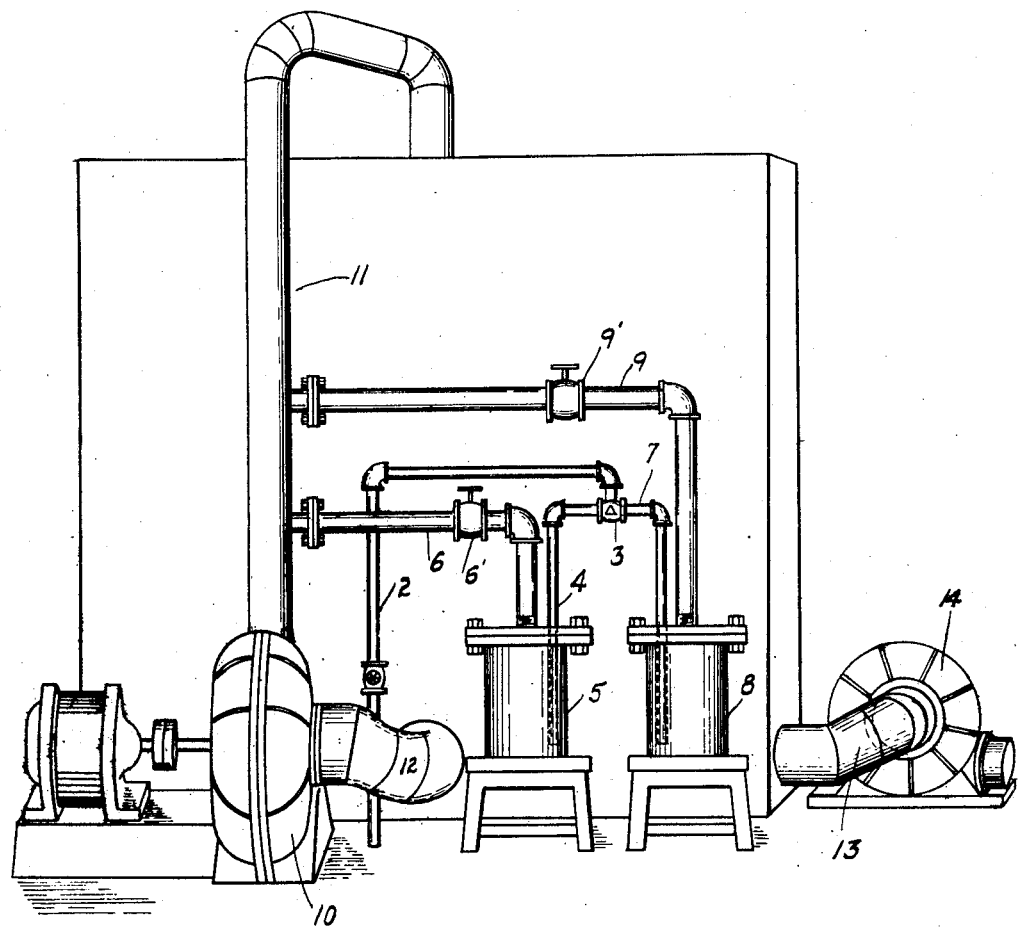
Inventor
SEAPHES D. SHINKLE
By his Attorney Patented Oct. 27, 1931

1,828,985

UNITED STATES PATENT OFFICE

SEAPHES D. SHINKLE, OF NEW HAVEN, CONNECTICUT, ASSIGNOR TO L. CANDEE & COMPANY, OF NEW HAVEN, CONNECTICUT, A CORPORATION OF CONNECTICUT

METHOD OF SUPERFICIALLY FINISHING RUBBER ARTICLES

Application filed December 13, 1926. Serial No. 154,619.

This invention relates to a method of superficially finishing rubber articles, and the product thereof, more particularly as applied to the finishing of rubber footwear articles. This case is a continuation in part of application Serial No. 80,977, filed January 13, 1926.

Ordinary soft cured rubber articles which have been vulcanized in open heat have a semi-gloss finish that is easily marked, while in the case of certain articles such as rubber footwear, hand baggage, etc., a large part of the trade demands a glossy finish. To produce such a finish, articles such as rubber footwear, etc., have usually been varnished before vulcanization with a vulcanizable varnish, this varnish ordinarily consisting of an oxidizable or drying oil, such as linseed, compounded with sulphur and other materials such as rosin, gilsonite, etc., the specific proportions and ingredients varying somewhat with different manufacturers. The articles, after coating with such a varnish and vulcanization acquire a high gloss. However, the finish is quite soft and tacky after removal from the vulcanizing oven, so that it is impossible to immediately wrap the goods in paper and pack them, since the paper tends to stick to the goods. This necessitates a further drying or treatment in the open air to remove the tackiness before the goods can be packed, with resulting loss of time and use of valuable factory space. Moreover while the air treatment will remove the tackiness sufficiently to enable the goods to be handled and packed, it persists in some degree for a considerable length of time, and certain branches of the trade object to this condition and desire goods having a relatively hard, smooth and non-tacky finish when received.

An object of my invention is to provide an improved method for superficially finishing rubber articles. Another object is to provide a method for immediately removing the tackiness and softness of the finish of vulcanized varnished rubber articles. Another object is to provide rubber articles with a finish which is smooth, lasting, and resistant to abrasion, cracking or marking. Another object is to speed up the production of varnished rubber articles such as footwear.

Without intention to limit the invention otherwise than as required by the prior art the method consists broadly in subjecting varnished rubber articles to both vulcanization and a superficial treatment with a halogen or halide of one of the sulphur group such as sulphur or selenium in gaseous form, either of these operations being performed first. It further consists in first applying to the article a varnish embodying an oxidizable or d ying oil, vulcanizing the article, and giving the varnish a superficial treatment with a sulphur chloride. The invention also comprises the product of the method.

For a detailed disclosure of the nature and objects of the invention reference is had to the accompanying specification and drawing, in which latter:

The figure is a front elevation of a suitable form of apparatus for carrying out the method.

Referring to the drawing, the numeral 1 designates a box or chamber in which may be deposited the articles which are to be treated by the method. This box or chamber may be of any suitable dimensions, shape and material. A pipe 2 leading from a suitable source of compressed air or other inert gas is connected to a three-way valve 3, and from one branch of the latter a pipe 4 extends some distance into a receptacle 5 for the treating agent, so as to bubble up through the latter and become charged with it. The treating agent may be sulphur mono or dichloride, chlorine, bromine, sulphurylchloride, thionylchloride, or seleniumoxychloride. As chlorine is a gas at ordinary temperatures and pressures, the charging apparatus 4 is of course unnecessary when using chlorine, and the gas may be directly mixed with the air. Leading from the receptacle 5 is a pipe 6 governed by a valve 6' for conducting away the air or other gaseous fluid charged with the treating agent. Also connected to the three-way valve 3 is a pipe 7 extending into a receptacle 8 containing ammonia or other base capable of neutralizing the treating agent, in a manner to be hereinafter described. Leading from the receptacle 8 is a pipe 9 governed by a valve 9' for conducting away air or other gaseous fluid charged with the ammonia or other neutralizing material used. A circulating pump 10 has its discharge outlet connected to a pipe 11 leading into the top of chamber 1, and the respective pipes 6 and 9 are tapped into the pipe 11, while the inlet of the pump 10 is connected by a pipe 12 to the bottom portion of the chamber 1. Leading from the chamber 1 is a pipe 13 connected to an exhaust pump 14 for exhausting the gases from the chamber 1 when desired.

In carrying out one form of the method rubber articles, for instance rubber footwear, are dipped, sprayed or otherwise coated with the usual varnish embodying an oxidizable or drying oil and sulphur, the oil most commonly used being boiled linseed oil. The articles may be then placed in the vulcanizer and cured as usual. On removal the articles have a bright glossy finish, but the surface of the varnish is soft and quite tacky, and in this condition can be easily marked or defaced. The surface treatment of the articles may be accomplished at any later period, but it is preferred to take the articles while still warm after vulcanization and place them in the chamber 1. The valve 3 is then turned to admit compressed air into the receptacle 5 and this air charged with the treating agent, preferably sulphur monochloride, is conducted through the pipe 6 and then through the pipe 11 into the chamber 1. By means of the pump 10, a continuous circulation of the treating gases in the chamber 1 is obtained. The concentration of the sulphur monochloride in the air or other carrying fluid is preferably kept rather low. The action of the treating agent if in any great strength or if applied for any length of time is injurious to the linings or other fabric parts of the rubber articles being treated, and to obviate such injury, as soon as the surface treatment of the article has continued long enough to obtain the desired effect the three-way valve 3 is turned to cut off the flow of the air or other carrier medium into the receptacle 5, and the air is instead diverted into the receptacle 8 and thence through pipes 9 and 11. This causes the introduction into the chamber 1 of air or other carrier medium impregnated with ammonia or other neutralizing agent for the treating medium. After sufficient time has elapsed to insure the complete neutralization of any excess sulphur chloride the valve 3 is turned to cut off the flow of compressed air into receptacle 8, and the gases may then be exhausted from the chamber 1 by the pump 14 and the chamber opened and the articles removed.

In order to economize on the use of ammonia, it is preferred after the treatment with the sulphur chloride or other treating agent to first exhaust the fumes from the chamber before supplying ammonia thereto. While the time of treatment will vary depending upon conditions an average one is timed about as follows: 3 to 10 minutes with the halogen, sulphur chloride or other treating agent, 2 to 4 minutes exhausting unused gas from the chamber, ½ to 2 minutes treatment with the neutralizing base, and 2 to 4 minutes exhausting before removal of the articles from the chamber.

As a modification of the above described method the varnished articles may be first treated with the halogen or sulphur halide and then vulcanized. When the method is carried out in this manner the action of the halogen or sulphur halide is to first produce a relatively thin hardened film on the varnish, and when the article is later vulcanized this film contracts so as to give the vulcanized article a finely crinkled or puckered but glossy surface. This crinkled surface has an ornamental appearance which is desirable in the case of certain classes of goods, such as auto topping and other sheet materials, children's rubber footwear, etc.

By the use of my invention the tacky feel of varnished rubber articles may be entirely removed and the varnish given a glossy, lasting surface which is strongly resistant to abrasion, cracking or marking. It produces an article which has been entirely freed from tackiness in a short time and which consequently can be immediately packed after the treatment. An article finished in this manner also meets the requirements of those portions of the trade which demand that goods even when newly received shall have a hard glossy surface free from tackiness.

The expression "halide of a metalloid" is to be contemplated broadly as including the halides mentioned herein or their equivalents.

While a specific embodiment of the invention has been described, it is obvious that it is capable of considerable modification, and it is therefore not desired to limit the invention otherwise than as set forth in the appended claims.

Having thus described my invention what I claim and desire to protect by Letters Patent is:

1. The method of finishing vulcanizable articles which comprises coating a rubber article with a varnish comprising an oxidizable oil, and both heat curing, and subjecting the coated article to a superficial treatment with a medium containing a low concentration of a halogen-supplying material.

2. The method of finishing vulcanizable articles which comprises coating a rubber article with a varnish comprising an oxidizable oil, and both heat curing, and subjecting the coated article to a superficial treatment with a sulphur chloride in a circulating medium.

3. The method of finishing vulcanizable articles which comprises coating a rubber article with a varnish comprising a drying oil, and both heat curing, and subjecting the coated article to a superficial treatment with a circulating medium containing a halide of a metalloid selected from the group consisting of sulphur and selenium.

4. The method of finishing vulcanizable articles which comprises coating the article with a varnish comprising a drying oil and sulphur, and both heat curing, and subjecting the coated article to a superficial treatment with a circulating medium containing a low concentration of a sulphur chloride.

5. The method of finishing vulcanizable articles which comprises coating a rubber article with a varnish comprising a boiled drying oil, and both heat curing, and subjecting the coated article to a superficial treatment with diluted sulphur monochloride.

6. The method of finishing vulcanizable articles which comprises coating a rubber footwear article with a varnish comprising boiled linseed oil and sulphur, and both heat curing and superficially treating the coated article with a circulating gaseous medium containing a low concentration of a sulphur chloride.

7. The method of finishing vulcanizable articles which comprises coating a rubber footwear article with a varnish comprising an oxidizable oil, vulcanizing, then subjecting the coated article to a limited superficial treatment with a gaseous fluid containing a low concentration of a halogen-supplying material, and neutralizing excess of the treating agent.

8. The method of finishing vulcanizable articles which comprises coating a rubber footwear article with a varnish comprising a drying oil and sulphur, vulcanizing, then subjecting the coated article to a limited superficial treatment with the vapor of a sulphur chloride diluted with an inert gas, and neutralizing the excess sulphur chloride with a base.

9. The method of finishing vulcanizable articles which comprises coating a rubber footwear article with a varnish comprising linseed oil and sulphur, vulcanizing, and then first subjecting the article to a circulating gaseous current containing a low concentration of a halogen-supplying material and then to a gaseous current containing a base.

10. The method of finishing vulcanizable articles which comprises coating a rubber footwear article with a varnish comprising boiled linseed oil and sulphur, vulcanizing, and then first subjecting the coated article to a circulating gaseous current containing a low concentration of sulphur monochloride and then to a gaseous current containing ammonia.

11. The method of finishing rubber footwear articles which have been varnished and then vulcanized which comprises giving them a hardened, non-tacky and wear-resisting surface by a mild treatment with a sulphur chloride diluted with an inert gas, and subsequently neutralizing excess of said agent.

12. The method of finishing rubber footwear articles which have been oil-varnished and then vulcanized which comprises giving them a hardened, non-tacky and wear-resisting surface by treatment with sulphur monochloride vapor diluted with an inert gas.

13. The method of finishing vulcanizable articles which comprises coating the rubber article with a varnish comprising an oxidizable oil and both heat curing and mildly treating the surface of the article with a halogen-supplying material in gaseous form.

14. The method of finishing vulcanizable articles which comprises coating the rubber article with a varnish comprising an oxidizable oil and both heat curing and mildly treating the surface of the article with a diluted halogen-supplying material in gaseous form.

15. The method of finishing vulcanizable articles which comprises coating the rubber article with a varnish comprising an oxidizable oil and both heat curing and mildly treating the surface of the article with a circulating diluted halogen-supplying material in gaseous form.

16. The method of finishing vulcanizable articles which comprises coating the rubber article with a varnish comprising an oxidizable oil, and subjecting the surface of the article to a circulating gaseous current containing a low concentration of a halogen-supplying material.

Signed at New Haven, county of New Haven, and State of Connecticut, this tenth day of December, 1926.

SEAPHES D. SHINKLE.